(12) United States Patent
Rosenberg et al.

(10) Patent No.: US 12,347,418 B2
(45) Date of Patent: Jul. 1, 2025

(54) SYSTEMS AND METHODS FOR TRAINING NATURAL LANGUAGE PROCESSING MODELS IN A CONTACT CENTER

(71) Applicant: Five9, Inc., San Ramon, CA (US)

(72) Inventors: Jonathan Rosenberg, Freehold, NJ (US); Priyanka Balakumar, San Ramon, CA (US)

(73) Assignee: FIVE9, INC., San Ramon, CA (US)

( * ) Notice: Subject to any disclaimer, the term of this patent is extended or adjusted under 35 U.S.C. 154(b) by 638 days.

(21) Appl. No.: 17/705,484

(22) Filed: Mar. 28, 2022

(65) Prior Publication Data

US 2022/0319496 A1 Oct. 6, 2022

Related U.S. Application Data

(60) Provisional application No. 63/167,699, filed on Mar. 30, 2021.

(51) Int. Cl.
  *G10L 15/06* (2013.01)
  *G10L 13/02* (2013.01)
  *G10L 15/30* (2013.01)

(52) U.S. Cl.
  CPC ............ *G10L 15/063* (2013.01); *G10L 13/02* (2013.01); *G10L 15/30* (2013.01); *G10L 2015/0638* (2013.01)

(58) Field of Classification Search
  CPC ....... G10L 15/063; G10L 13/02; G10L 15/30; G10L 2015/0638
  See application file for complete search history.

(56) References Cited

U.S. PATENT DOCUMENTS

| 7,092,888 | B1 | 8/2006 | McCarthy et al. |
| 9,118,763 | B1 | 8/2015 | Margulies et al. |
| 11,106,869 | B1* | 8/2021 | Kanefsky ............... H04W 4/14 |
| 2009/0006345 | A1* | 1/2009 | Platt ..................... G06F 40/274 |
| 2009/0292541 | A1* | 11/2009 | Daya ..................... G10L 15/063 |
| | | | 704/E15.005 |
| 2014/0270108 | A1 | 9/2014 | Riahi et al. |

(Continued)

OTHER PUBLICATIONS

Patent Cooperation Treaty, International Search Report and Written Opinion, PCT/US2022/022109, dated Jul. 14, 2022.

(Continued)

*Primary Examiner* — Daniel C Washburn
*Assistant Examiner* — Athar N Pasha
(74) *Attorney, Agent, or Firm* — Jones Day

(57) ABSTRACT

Systems and methods are provided for training natural language processing (NLP) models in a contact center. The systems and methods provided may render the process of training an NLP model faster, easier to perform, and more accessible to non-experts. In embodiments of the present disclosure, a method for training an NLP model includes a first step of initializing an NLP model with an intent and one or more seed phrases. The next step may be to receive a customer interaction. Next, a matched utterance can be generated based on the customer interaction and the NLP model. Then, a suggested training phrase may be generated based on the matched utterance. The suggested training phrase may be confirmed. Thereafter, the NLP model can be updated with the confirmed training phrase.

15 Claims, 8 Drawing Sheets

| Event Name | Summary Sentence |
|---|---|
| CALL_ACCEPTED | Agent Accepted call |
| Customer-Pie | Customewr likes pie, a wicked lot |
| Agent-Cheeseburger | Agent likes cheeseburgers |
| Agent-AgentStartCoBrowse | Customer not following-START COBROWSE SESSION NOW |
| Agent-Manager Escalation | Agent mentioned escalating to manager |
| Customer-Escalation request | Customer asked for manager escalation |
| Customer-CreateOrder | Customer asked to create an order |
| Customer-CreateServiceRequest | Customer asked to create a service request |
| Agent-Upsell | Agent offered an upsell opportunity |
| Customer-Book Vacation | Customer talked about booking a vacation |

Five9 Conversation Architect: Summary Configuration — Built: 1.18.0 (3/12/2021, 7:14pm)

(56) References Cited

U.S. PATENT DOCUMENTS

| | | | |
|---|---|---|---|
| 2015/0120289 A1* | 4/2015 | Lev-Tov | G10L 15/01 |
| | | | 704/231 |
| 2015/0231343 A1* | 8/2015 | Reilly | A61B 7/003 |
| | | | 128/202.22 |
| 2016/0104481 A1 | 4/2016 | Ehsani et al. | |
| 2017/0228365 A1* | 8/2017 | Levy | G06F 40/30 |
| 2017/0249557 A1* | 8/2017 | Tendick | G06Q 30/02 |
| 2018/0247648 A1 | 8/2018 | Nadimpalli et al. | |
| 2019/0361977 A1* | 11/2019 | Crudele | G06F 40/284 |
| 2020/0076947 A1* | 3/2020 | Deole | H04M 3/527 |
| 2021/0065042 A1* | 3/2021 | Gopalan | G06N 3/045 |
| 2021/0319481 A1* | 10/2021 | Maheswaran | G06Q 30/0281 |
| 2021/0407679 A1* | 12/2021 | Liu | G06F 40/30 |

OTHER PUBLICATIONS

Lopez; Five9 Aims to Unlock Insight From Contact Center With Artificial Intelligence; Forbes; Oct. 25, 2018.
Canadian Intellectual Property Office, Office Action dated Nov. 29, 2024, Canadian Patent Application No. 3,212,457 (5 pages).

* cited by examiner

Five9 Conversation Architect: Summary Configuration    Built: 1.18.0 (3/12/2021,7:14pm)

Summary Intents

| Event Name | Summary Sentence |
|---|---|
| CALL_ACCEPTED | Agent Accepted call |
| Customer-Pie | Customewr likes pie, a wicked lot |
| Agent-Cheeseburger | Agent likes cheeseburgers |
| Agent-AgentStartCoBrowse | Customer not following-START COBROWSE SESSION NOW |
| Agent-Manager Escalation | Agent mentioned escalating to manager |
| Customer-Escalation request | Customer asked for manager escalation |
| Customer-CreateOrder | Customer asked to create an order |
| Customer-CreateServiceRequest | Customer asked to create a service request |
| Agent-Upsell | Agent offered an upsell opportunity |
| Customer-Book Vacation | Customer talked about booking a vacation |

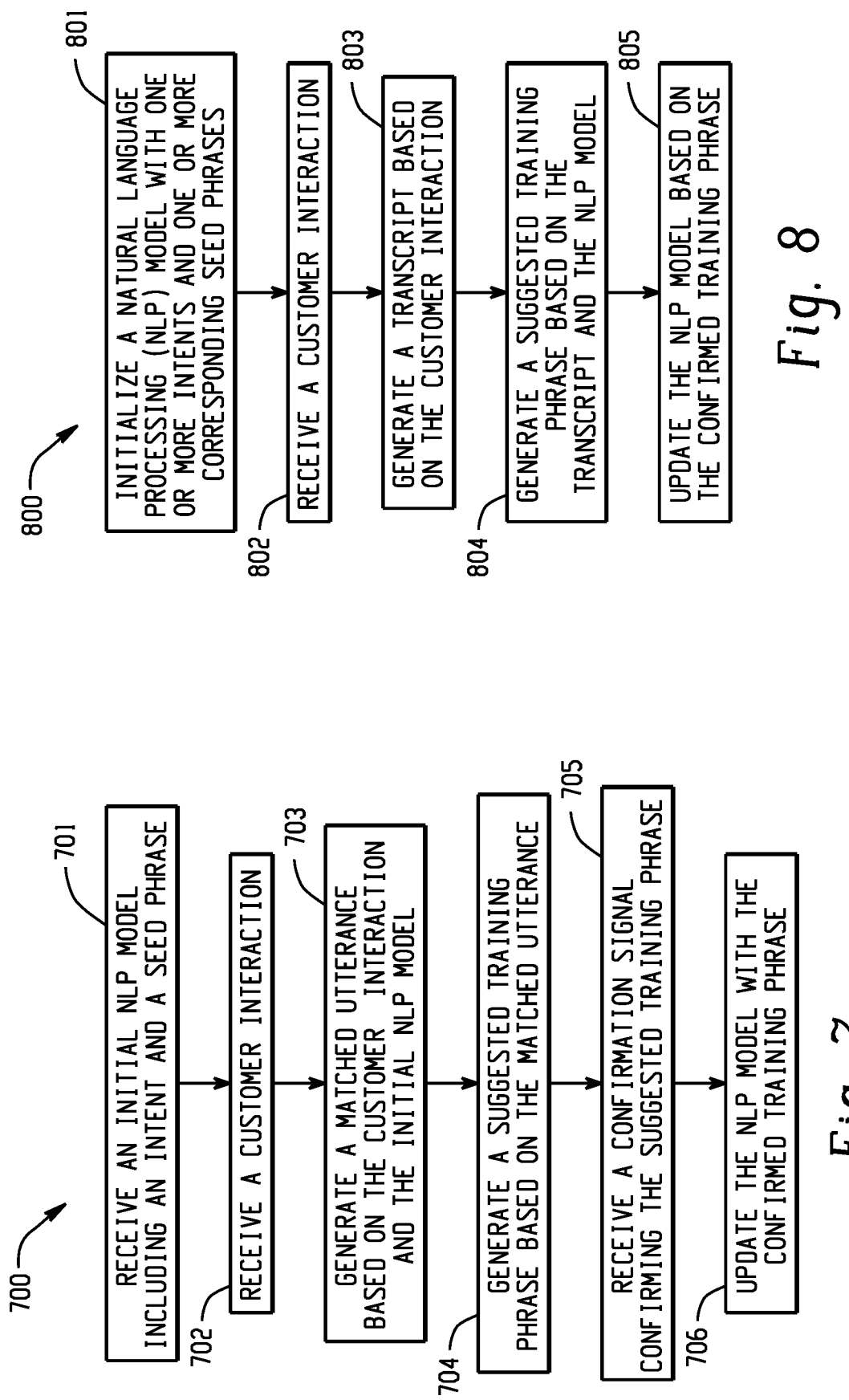

SYSTEMS AND METHODS FOR TRAINING NATURAL LANGUAGE PROCESSING MODELS IN A CONTACT CENTER

CROSS-REFERENCE TO RELATED APPLICATIONS

This application claims priority to U.S. Provisional Application No. 63/167,699, filed Mar. 30, 2021, which is incorporated herein by reference in its entirety.

TECHNICAL FIELD

The present disclosure relates to systems and methods for training Natural Language Processing (NLP) models.

BACKGROUND

Natural Language Processing (NLP) technologies are commonly used in contact centers. In order to be utilized in contact centers, NLP technologies must be trained. Conventional methods of NLP technology training can be complex, and typically require input from experts in natural language processing. Furthermore, in conventional methods, the tools used to train NLP models are isolated from contact center software and its recordings. As a result, the tooling can be complex, hard to use, and require manual processing steps. For these technologies to realize widespread deployment, better techniques are required to make the process faster, easier to perform, and more accessible to non-experts.

SUMMARY

The present disclosure describes systems and methods of creating training phrases in a natural language processing (NLP) model. In embodiments of the present disclosure, a method includes receiving by one or more processors an initial NLP model from a non-transitory computer-readable medium, the initial NLP model comprising an intent and seed phrases; receiving by the one or more processors a customer interaction; generating by the one or more processors a matched utterance based on the customer interaction and the initial NLP model; generating by the one or more processors a suggested training phrase based on the matched utterance; and updating the NLP model with the confirmed training phrase.

The method described above may further include the step of receiving by the one or more processors a confirmation signal confirming the suggested training phrase. The method may also include the step of determining by the one or more processors that the NLP model is complete based on input received from an analyst. This input can be based on a determination that the number of training phrases in the model has reached a pre-determined number. In some embodiments, receiving the confirmation signal confirming the suggested training phrase further comprises showing to human user the suggested training phrase and contextual information about the training phrase and validating the training phrase. Validating the training phrase may comprise comparing the training phrase to one or more previously confirmed training phrases and determining that the training phrase is sufficiently similar to the previously confirmed training phrases. The confirmation signal may be based on the determination that the training phrase is sufficiently similar to the previously confirmed training phrases.

The step of validating the training phrase may include receiving from two or more secondary human users one or more validation signals indicating an approval or a disapproval of the training phrase. It may also include determining whether a plurality of the secondary human users approve of the training phrase based on the validation signals, and validating the training phrase based on a determination that a plurality of the secondary human users approve of the training phrase. In other embodiments, the step of validating the training phrase includes receiving from two or more secondary human users one or more validation signals indicating an approval or a disapproval of the training phrase. In such embodiments, the step of validating the training phrase may further include determining whether all of the secondary human users approval of the training phrase based on the validation signals and validating the training phrase based on a determination that all of the secondary human users approve of the training phrase.

Generating a suggested training phrase based on the matched utterance may include determining a confidence level with which the matched utterance matches the NLP model and filtering the matched utterance based on the confidence level. In some embodiments, receiving the initial NLP model includes receiving from a human user portions of one or more transcripts, the portions being used as the seed phrases. In other embodiments, receiving the initial NLP model includes receiving a manually entered set of seed phrases, the manual entering being performed by a human user.

The present disclosure also describes a system for training an NLP model. In some embodiments, the system comprises an agent application, stored on a computer-readable medium and executable by one or more processors, that is configured to interface with a human contact center agent and to route customer interactions to the human contact center agent; a virtual contact center application, stored on a computer-readable medium and executable by the one or more processors, configured to receive the customer interactions, route the customer interactions to the agent application, and to generate transcripts based on the customer interactions; an analyst application, stored on a computer-readably medium and executable by the one or more processors, configured to interact with an analyst and to generate an analyst application input based on the interaction with the analyst; an intent recognition application, stored on a computer-readable medium and executable by the one or more processors, configured to receive the transcripts and to generate suggested training phrases based on the transcripts and the NLP model; and a suggestion management application, stored on a computer-readable medium and executable by the one or more processors, configured to receive the analyst application input and the suggested training phrases and to update the NLP model with confirmed training phrases based on the analyst application input and the suggested training phrases, the NLP model comprising one or more intents, training phrases and confidence thresholds.

The analyst application may be implemented on a mobile phone or on a computer. In some embodiments, the customer interactions includes calls, text messages, and emails. The virtual contact center application may be further configured to generate call recordings based on the calls. The transcripts of the calls can be generated by applying speech-to-text technologies to the call recordings.

The present disclosure also describes a non-transitory computer-readable medium having data stored therein representing software executable by a computer. In some embodiments, the storage medium includes instructions for initializing an NLP model with one or more intents and one or more corresponding seed phrases; instructions for receiving a customer interaction; instructions for generating a transcript based on the customer interaction; instructions for generating a suggested training phrase based on the transcript and the NLP model; and instructions for updating the NLP model based on the confirmed training phrase.

In some embodiments of the present disclosure, the storage medium further comprises instructions for generating a confirmed training phrase by receiving a confirmation signal confirming the suggested training phrase. The instructions for generating a suggested training phrase based on the transcript and the NLP model may include instructions for generating a matched utterance based on the customer interaction and the NLP model; instructions for determining a confidence level with which the matched utterance matches the NLP model; and instructions for filtering the matched utterance based on the level of confidence.

BRIEF DESCRIPTION OF THE DRAWINGS

The following detailed description will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

FIG. 3 shows a user interface of an analyst application used in the entry of intents, in accordance with some embodiments.

FIG. 7 shows a method of creating training phrases in an NLP model, in accordance with some embodiments.

FIG. 8 shows instructions of a non-transitory computer-readable storage medium, in accordance with some embodiments.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
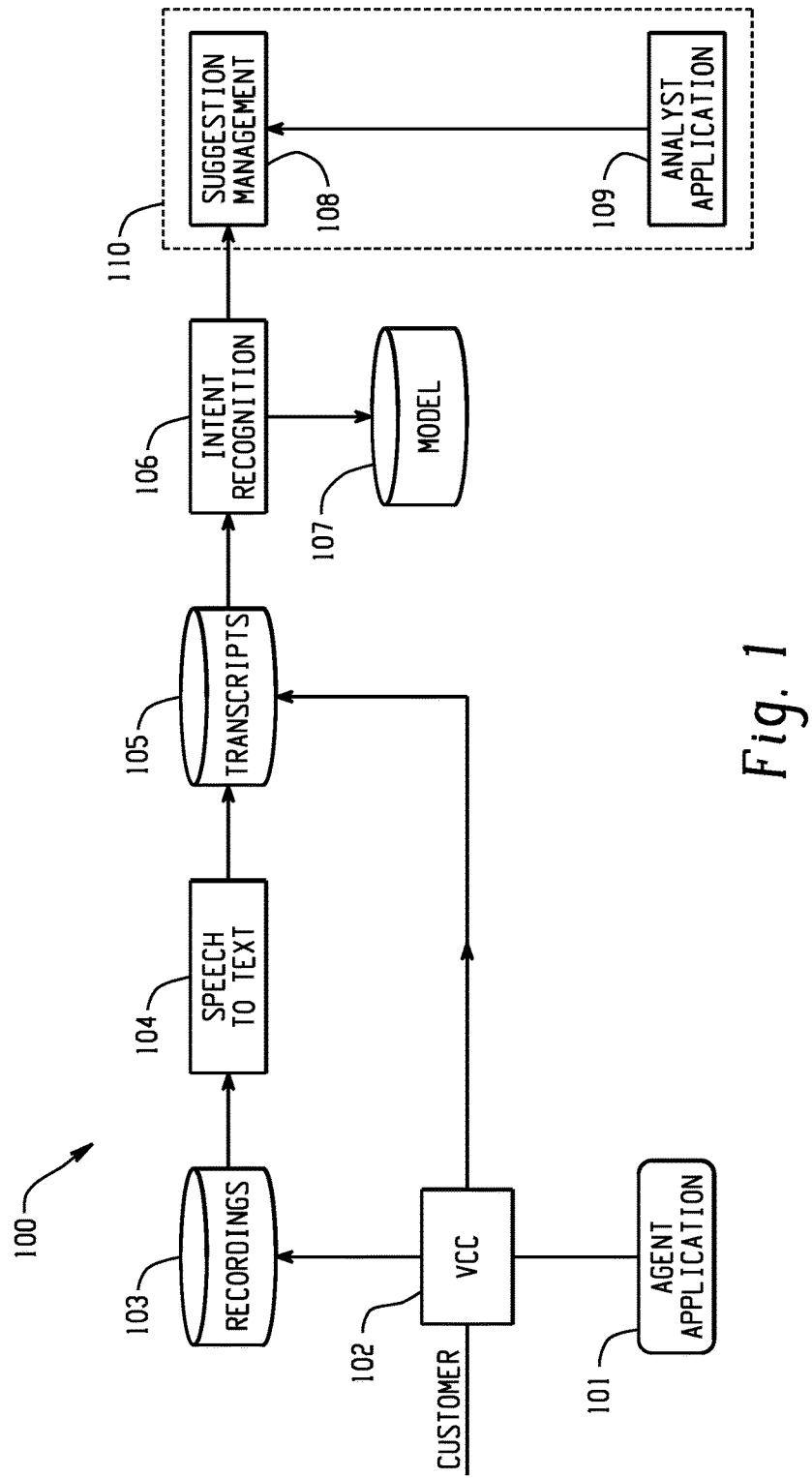
FIG. 1 shows a diagram of a system for training an NLP model in a contact center, in accordance with some embodiments.

FIG. 1 is a diagram of an example embodiment of a system for training an NLP model 100. In the example shown in FIG. 1, the system 100 includes an agent application 101, a virtual contact center (VCC) application 102, recordings 103, speech-to-text technologies 104, transcripts 105, an intent recognition application 106, one or more models 107, suggestion management application 108, and an analyst application 109. In some embodiments, the agent application 101 is used by a human contact center agent. This agent application 101 may a traditional application for contact center agents which allows them to receive and manage calls, chats, texts, and other interactions from customers. The agent application 101 can be coupled to the VCC application 102. In some embodiments, the VCC application 102 is a software component capable of handling customer interactions and routing these interactions to agents. The VCC application 102 may be capable of generating call recordings 103 for audio calls and also of generation of text transcripts 105 for email, chat, SMS, and/or textual interactions. Speech-to-text technologies 104 may be applied to the call recordings 103 to generate the transcripts 105. The generation of recordings 103 and transcripts 105 based on a live call can be done in real-time. Alternatively, customer interactions such as calls and email may be stored in memory by the VCC application 102, with recordings 103 and/or transcripts 105 generated subsequently. These transcripts 105 can in turn be fed into the intent recognition application 106. The results of this intent recognition application 106 can then be passed to the suggestion management application 108. In embodiments, these results are suggested training phrases.

Also depicted in FIG. 1 is an analyst application 109. In embodiments of the present disclosure, an analyst is responsible for the task of curating one or more training phrases for a model. The analyst may use an analyst application 109 which communicates with suggestion management application 108. This analyst application 109 may be displayed to the analyst on their personal computer or on a mobile phone, for example. The suggestion management application 108 may configure models 107 which are then used by an intent recognition application 106. These models 107 may include the set of intents, their training phrases, and confidence thresholds. The suggestion management application 108 and the analyst application 109 that connects to it can be used to execute a workflow process 110. Such a process is described in greater detail in the discussion of FIG. 2.

Figure 2:
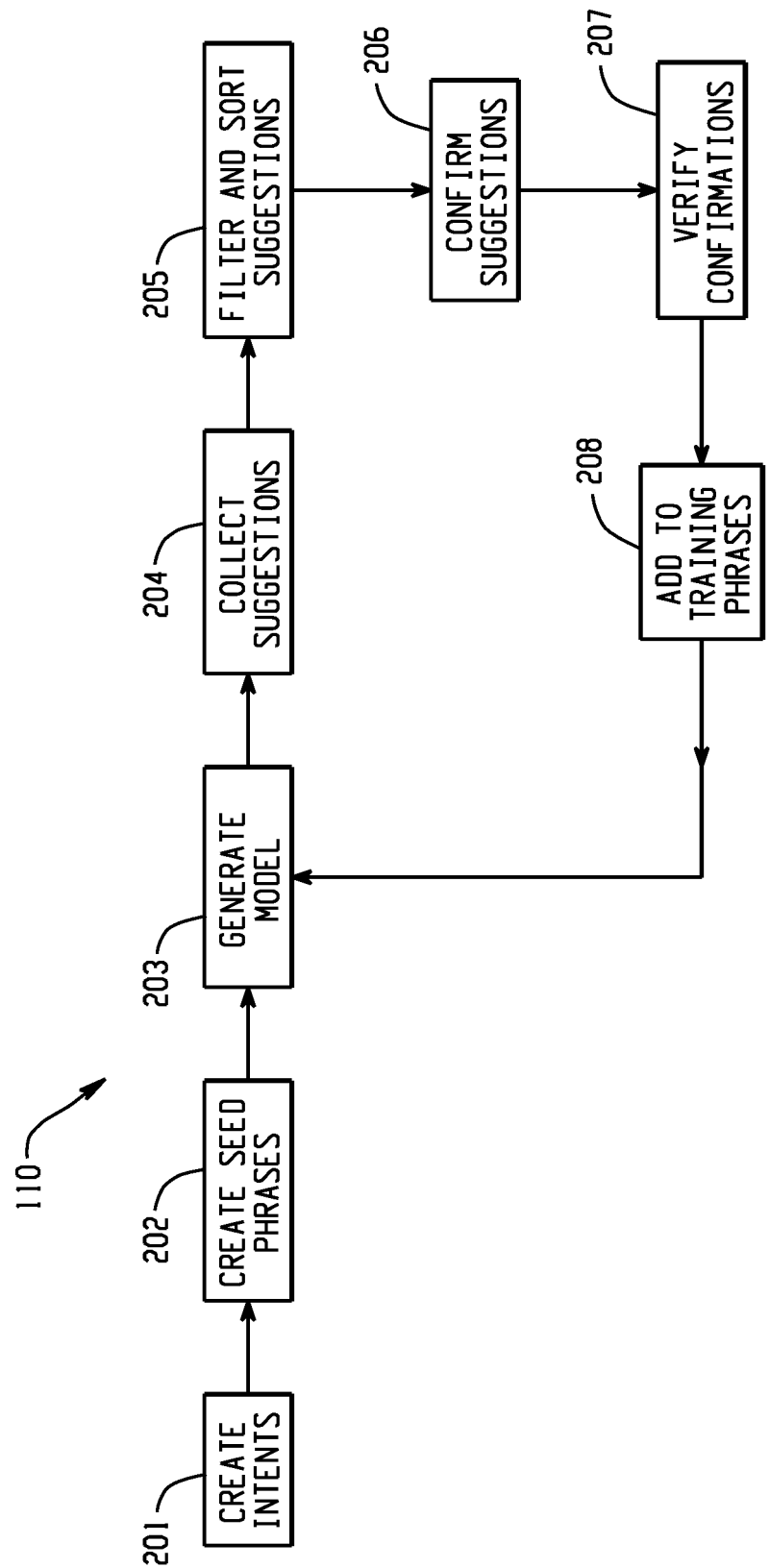
FIG. 2 shows a suggestion management workflow process, in accordance with some embodiments.

FIG. 2 depicts the suggestion management workflow process 110, in accordance with some embodiments. The process utilizes semi-supervised learning techniques to facilitate the creation of a trained artificial intelligence (AI) model. The process is initialized with the creation of a set of intents 201 which are to be used in the model. These intents can represent detectable customer objectives. In one example embodiment, intents are entered via a user interface of the analyst application 109. In one example, intents can be determined by simply being written down. This may be the case when there is an understanding of a particular business need. For example, a contact center wishing to automate bank account self-service may know that intents will be needed for tasks such as checking a balance, transferring funds, depositing checks, etc. In another example embodiment, the intents can be discovered through keyword searches or through reading and listening to transcripts of live calls and chats in a contact center. The intents may be determined in many different ways that are within the spirit and scope of the present disclosure. The analyst may enter these intents into the system. Alternatively, the intents can be uploaded via an application programming interface (API) from some other system. The elements of the example process 110 shown in FIG. 2 are best understood when discussed in conjunction with FIGS. 1, 3, 4, and 5.

FIG. 3 depicts an example embodiment of a user interface 300 of an analyst application 109 used in the entry of intents. In the example shown in FIG. 3, intents each have a name and an example. These intents may also be referred to as "events". The analyst can add new intents, delete existing intents, or edit existing intents. Following the creation of an intent 201, the analyst may create seed phrases, as represented by block 202 of FIG. 2. Seed phrases are training phrases that are sufficient to create a low accuracy NLP model. In one embodiment, the analyst can manually type in a small number of training phrases (e.g., three or four). In another embodiment, the analyst uses the analyst application 109 to search through transcripts 105 and highlight or otherwise select a good example of a training phrase for the intent. In still another embodiment, the analyst creates seed phrases 202 by a combination of the two. For example, the analyst may select a first training phrase from the transcripts 105 and then type in similar sounding phrases without them being discovered in the transcript itself.

Once seed phrases have been configured by the analyst, the suggestion management application 108 may create an NLP model 107 using the set of intents and their seed phrases, as shown in block 203 of FIG. 2. There may be one model 107 representing a combination of all of the intents. In some embodiments, there may be two models 107. For example, one model 107 may represent a customer's participation in a conversation, and another model may represent an agent's participation in the conversation. The NLP model or models 107 can be created using pre-existing intent engines, such as the Google Dialogflow, IBM Watson, Microsoft Cortana. In other embodiments, the NLP model or models 107 can be created through transfer learning from pre-trained NLP models such as BERT (Bidirectional Encoder Representations from Transformers).

Once the model 107 has been created, recordings 103 and transcripts 105 of customer interactions may be input to the model 107. The model 107 will generate a determination of whether or not the model 107 matched a given utterance to an intent. If there is a determination that the utterance matched an intent, there can then be a further determination of the level of confidence with which the utterance matched the intent. These confidence levels are an output of the model as well, and are provided by pre-existing intent engines such as Google Dialogflow, IBM Watson, Microsoft Cortana, and others. The suggestion management application 108 can be configured so that only some customer interactions are processed, or it may be configured such that all of them are processed. For example, if a company or user wishes to create a model 107 for only a specific use case associated with a specific disposition, only calls or chats with that disposition are processed. In another embodiment, if a company wishes to only process calls associated with a specific inbound telephone number, only calls with the specific telephone number are processed.

As the NLP model training system 100 processes real calls, texts, and chats through the system 100, utterances and their matched intents are collected and stored by the suggestion management application 108. This process is shown in block 204 of FIG. 2. As more time passes and more calls, texts, and chats are collected and processed, more utterances and matched intents are determined and collected.

After the utterances and the corresponding matched intents are determined, the suggestion management application 108 may filter them, as shown in block 205 of FIG. 2. For example, the utterances and the matched intents may be filtered using confidence percentages produced by the NLP model 107. This may be accomplished by retaining the utterances that match a corresponding intent with a confidence percentage that is above a certain threshold. Alternatively, the filtering 205 can be done by clustering techniques which measure similarity to existing training phrases in the model 107. In some embodiments of the present disclosure, these existing training phrases are initially the seed phrases. Once filtered, the utterances can then be sorted based on which ones are most likely to be a sufficient training phrase for the intent. The sorting of the utterances is also shown in block 205 of FIG. 2. This sorting 205 can be based on the same metric used to filter the utterances. In other embodiments, this sorting 205 can utilize a metric or process different from the metric or process used to initially filter the utterances and the matched intents. The set of sorted and filtered utterances for each intent may be referred to as "suggestions."

Figure 4:
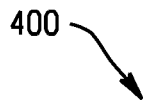
FIG. 4 shows a task list containing a set of intents, in accordance with some embodiments.

Once the suggestions are determined, the analyst can then process and confirm these suggestions, as shown in block 205 of FIG. 2. For example, the analyst may first log into the analyst application 109. In the analyst application 109, the analyst can be shown a set of intents as a task list 400. An example of a task list is shown in FIG. 4. A user interface of the analyst application 109 may guide the analyst to go through each intent and perform a set of confirmation tasks. When the agents selects a particular intent, they may be shown a screen containing the suggestions for that intent in order. For each suggestion, they may be shown the transcript 105 from which that suggestion came. In addition, the analyst may have access to the audio recording 103 if the interaction was a call. This access may be useful as it can provide context for the given suggestions. The analyst can then be asked to either confirm 206 or reject each suggestion. In other embodiments of the present disclosure, the analyst may be asked to confirm 206, reject, or dismiss each suggestion.

Figure 5:
FIG. 5 shows a user interface of the analyst application, in accordance with some embodiments.

FIG. 5 depicts an exemplary user interface 500 of the analyst application 109, in accordance with some embodiments. Once the analyst has confirmed or rejected the suggestions, the system 100 then attempts to verify the user action. This is demonstrated in block 207 of FIG. 2. This may be useful because this verification step can mitigate or eliminate the problem of human errors in confirming, rejecting, or dismissing the suggestions. In one example embodiment, the verification 207 can be performed through a voting process. The same suggestion can be handled by multiple analysts, each of them confirming, rejecting, or dismissing the suggestion. In one example, a suggestion is considered as a sufficient training phrase when it is confirmed by all such analysts. In another example, it can be considered a sufficient training phrase if it is confirmed by a majority of the analysts. In another embodiment, the confirmed phrases can be measured against the intent using a distance metric such as cosine similarity against the phrases already confirmed. If this distance metric is different from the one used to match the phrase to the intent, it can provide an additional degree of confidence in the validity of the suggestion as a training phrase. Suggestions confirmed by the analyst, whose distance metric is above a threshold, may be accepted as training phrases, while such suggestions below the threshold may be rejected or may require an additional confirmation step to be approved as training phrases for the intent. These verification steps 207, together with the process of the analyst confirming 206, rejecting, or dismissing each suggestion, can help ensure that only those suggestions as training phrases which are determined with a high degree of confidence to be training phrases for the intent are utilized.

Figure 6:
FIG. 6 shows an interface for accepting and rejecting suggested training phrases, in accordance with some embodiments.

The tasks performed by the analyst via the analyst application 109 may be performed in batches or by one suggestion at a time. If the tasks are performed in batches, the analyst can confirm 206, reject, and/or dismiss several suggestions and then submit them in groups of two or more. This process is depicted in FIG. 6. In the example 600 shown in FIG. 6, the analyst is in the process of accepting (i.e., confirming) five suggestions and rejecting one suggestion in a single batch. In the example shown in FIG. 6, this is accomplished via the user interface 300 of the analyst application 109.

After the suggestion management application 108 has determined which confirmed suggestions to use as training phrases, the set of training phrases for the model can be updated. This is demonstrated by block 208 of FIG. 2. The process of selecting suggestions for use as training phrases can then iterate. This iteration can occur based on new calls, new chats and texts. In other embodiments of the present disclosure, the iteration can be performed on previously recorded calls, chats, and texts. An iteration loop may continue until the system contains enough training phrases to be considered complete. The iteration loop is displayed in FIG. 2 via the arrow from block 208 to block 203, and the intermediate arrows and blocks between block 203 and block 208. Completeness may be defined based on a determination that the number of training phrases has reached a pre-determined number. In other embodiments, completeness may be defined based on a determination that the selected training phrases are at least of a certain accuracy, or based on feedback from analysts after requesting the analysts to confirm the results of the model and obtain an accuracy metric.

FIG. 7 shows a method 700 of creating training phrases in an NLP model 107, in accordance with some embodiments. In the example embodiment shown in FIG. 7, the first step 701 is to receive an initial NLP model with an intent and one or more seed phrases. The NLP model may be received by one or more processors from a non-transitory computer-readable medium. The second step 702 in the example of FIG. 7 is to receive a customer interaction. The third step 703 is to generate a matched utterance based on the customer interaction and the NLP model. The fourth step 704 is to generate a suggested training phrase based on the matched utterance. The fifth step 705 is to receive a confirmation signal confirming the suggested training phrase. The sixth step 706 in the example shown in FIG. 7 is to update the NLP model 107 with the confirmed training phrase. In some embodiments, the steps of FIG. 7 are performed by the one or more processors. The steps of FIG. 7 may also be performed on hardware or systems including, but not limited to, the hardware and systems shown in FIG. 9. Those of ordinary skill in the art will appreciate that the steps depicted in FIG. 7 are merely example steps and that the steps may be altered without departing from the broad scope of the present disclosure. Furthermore, those of ordinary skill in the art will appreciate that the method shown in FIG. 7 may be performed with steps that differ in order from the particular steps shown in FIG. 7 without departing from the broad inventive concept thereof.

FIG. 8 shows instruction of a non-transitory computer-readable storage medium 800, in accordance with some embodiments. The instructions illustrated in FIG. 8 may be best understood when discussed in conjunction with FIG. 9. In the example embodiment shown in FIG. 8, the first step 801 is to initialize an NLP model 107 with one or more intents and one or more seed phrases. The NLP model may be stored in a data storage device such as the data storage device 907 shown in FIG. 9. The second step 802 in the process of FIG. 8 is to receive a customer interaction. The customer interaction may be received, for example, by the agent application 901. The third step 803 in the process of FIG. 8 is to generate a transcript based on the customer interaction. The transcript 105 may be stored on data storage device 905. The fourth step 804 in the process is to generate a suggested training phrase based on the transcript and the NLP model. In some embodiments, the suggested training phrase is generated by the suggestion management application 908 of FIG. 9. The fifth step 805 in the example process of FIG. 8 is to update the NLP model 107 based on the confirmed training phrase. Those of ordinary skill in the art will appreciate that the steps depicted in FIG. 8 are merely example steps and that the steps may be altered without departing from the broad scope of the present disclosure. Furthermore, those of ordinary skill in the art will appreciate that the process shown in FIG. 8 may be performed with steps that differ in order from the particular steps shown in FIG. 8 without departing from the broad inventive concept thereof.

Figure 9:
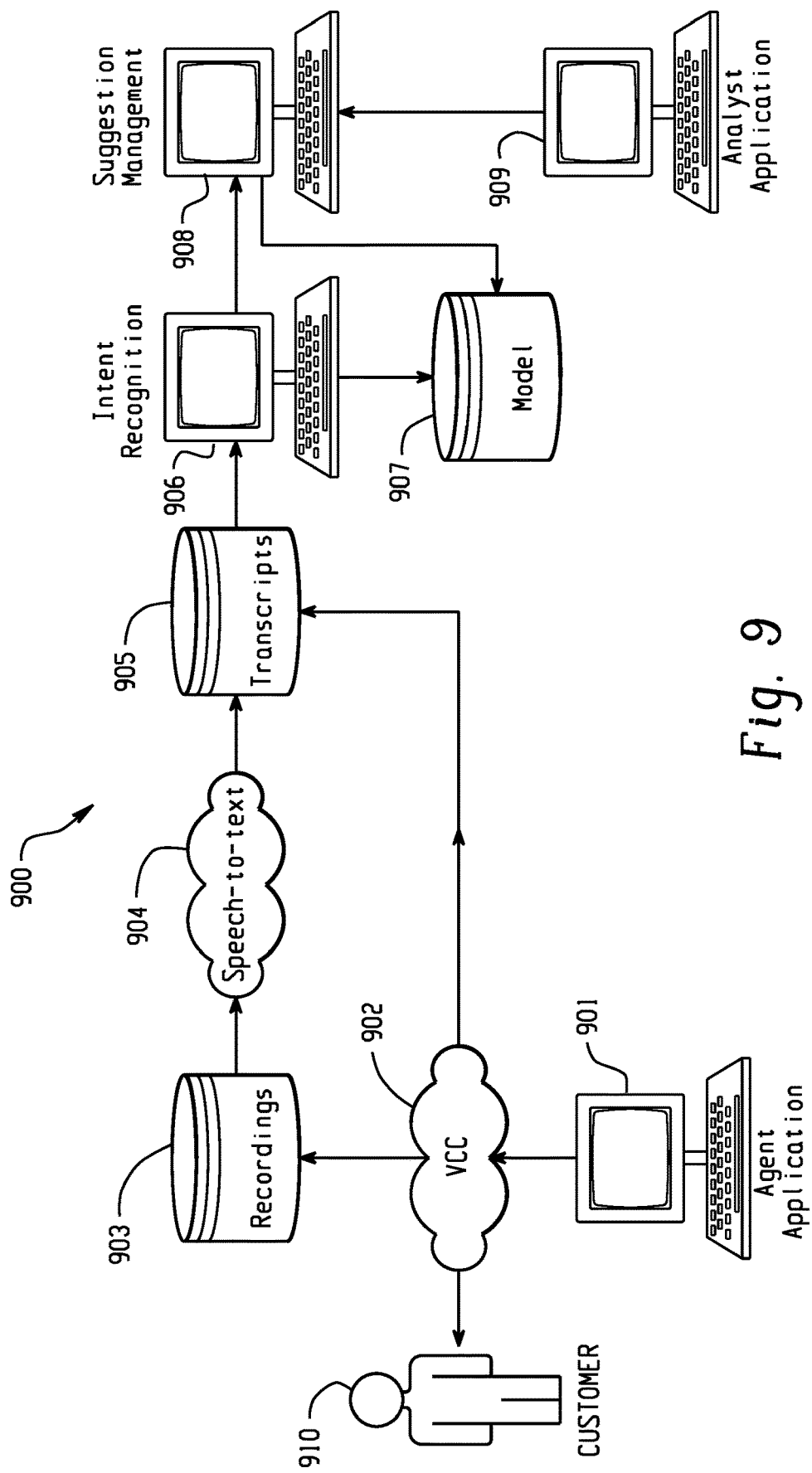
FIG. 9 shows a non-transitory computer-implemented system for training an NLP model in a contact center, in accordance with some embodiments.

FIG. 9 shows a non-transitory computer-implemented system for training an NLP model in a contact center, in accordance with some embodiments of the present disclosure. In the example embodiment shown in FIG. 9, the agent application 101 is implemented on a computer 901. This computer 901 may be coupled to a network 902 on which the VCC application 102 is implemented. In some embodiments, a customer 910 interfaces with this VCC application 102 through the network 902. This network can communicate with a data storage device 903 in order to store recordings 103 of customer interactions (e.g., audio calls). In some embodiments, this data storage device is a random-access memory (RAM) device. The network 902 may also generate transcripts 105 of other customer interactions, such as email and text message communications.

The recordings 103 from the data storage device 903 can then be input to a separate network 904, on which speech-to-text technologies can generate transcripts 105 based on the recordings 103. The transcripts may be stored on a separate data storage device 905. In some embodiments, this data storage device 905 is the same as the data storage device 903 used to store the recordings 103. In other embodiments, these data storage devices (903, 905) may be separate and independent storage devices. Thereafter, the transcripts 105 from the data storage device 905 may be input to an intent recognition application 106. This intent recognition application 106 can be implemented on a computer 906, in accordance with some embodiments. Those of ordinary skill in the art will appreciate that the intent recognition application 106 could be implemented on other devices, such as a mobile phone or tablet, in other embodiments that are within the spirit and scope of the present disclosure. The device containing the intent recognition application 906 may access the model 907 for the purpose of recognizing portions of transcripts 105 and corresponding intents within the model 907.

The intent recognition application 106 can then pass suggested training phrases to a device 908 that contains the suggestion management application 108. In some embodiments, this device 908 is a personal computer. In other embodiments, this device may be a mobile phone or tablet. An analyst application 109 can communicate with the suggestion management application 108. For example, the analyst application 109 can be used to confirm suggested training phrases that can be used in the model 107. The analyst application is implemented on a device 909. In some embodiments, this device 909 is a mobile phone. In other embodiments, this device 909 is a personal computer or tablet. Those of ordinary skill in art will appreciate that FIG. 9 depicts what is merely an exemplary embodiment of the system 100 of the present disclosure and that the system 100 may be implemented on other hardware components or systems while still being within the spirit and scope of the present disclosure. In addition, the system 100 or individual components of the system 100 may be implemented on the same hardware or storage device, or each may be employed on a different hardware or storage device.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. A system for training a natural language processing (NLP) model comprising:
   an agent application, stored on a non-transitory computer-readable medium and executable by one or more processors, configured to interface with a human contact center agent and to route customer interactions to the human contact center agent;
   a virtual contact center application, stored on a non-transitory computer-readable medium and executable by the one or more processors, configured to receive the customer interactions, route the customer interactions to the agent application, and to generate transcripts based on the customer interactions;
   an analyst application, stored on a non-transitory computer-readable medium and executable by the one or more processors, configured to interact with an analyst and to generate an analyst application input based on the interaction with the analyst;
   an intent recognition application, stored on a non-transitory computer-readable medium and executable by the one or more processors, configured to receive the transcripts and to generate suggested training phrases based on the transcripts and the NLP model; and
   a suggestion management application, stored on a non-transitory computer-readable medium and executable by the one or more processors, configured to receive the analyst application input and the suggested training phrases and to update the NLP model with confirmed training phrases based on the analyst application input and the suggested training phrases, the NLP model comprising one or more intents, training phrases and confidence thresholds, wherein the suggestion management application is further configured to
   receive one or more validation signals indicating an approval or a disapproval of a suggested training phrase by two or more human users,
   determine whether a plurality of the human users approve of the suggested training phrase based on the validation signals, and
   validate the suggested training phrase based on a determination that a plurality of the human users approve of the training phrase.

2. The system of claim 1, wherein the analyst application is implemented on a mobile phone.

3. The system of claim 1, wherein the analyst application is implemented on a personal computer.

4. The system of claim 1, wherein the customer interactions comprise calls, text messages, and emails.

5. The system of claim 4, wherein the virtual contact center application is further configured to generate call recordings based on the calls.

6. The system of claim 5, wherein the transcripts of the calls are generated by applying speech-to-text technologies to the call recordings.

7. The system of claim 1, wherein one or more of the suggested training phrases are generated by
   generating a matched utterance based on a customer interaction and the NLP model; and
   generating the suggested training phrase based on the matched utterance.

8. The system of claim 7, wherein generating the suggested training phrase based on the matched utterance comprises determining a confidence level with which the matched utterance matches the NLP model and filtering the matched utterance based on the confidence level.

9. The system of claim 1, wherein the suggestion management application is further configured to determine that the NLP model is complete based on input received from the analyst.

10. The system of claim 9, wherein the input received from the analyst is based on a determination that a number of training phrases in the NLP model has reached a predetermined number.

11. The system of claim 1, wherein the suggestion management application is further configured to
   show to the two or more human users the suggested training phrase and contextual information about the suggested training phrase.

12. The system of claim 1, wherein validating the suggested training phrase comprises comparing the suggested training phrase to one or more previously confirmed training phrases and determining that the suggested training phrase is sufficiently similar to the previously confirmed training phrases, the one or more confirmation signals being based on the determination that the training phrase is sufficiently similar to the previously confirmed training phrases.

13. The system of claim 1, wherein the suggested training phrase is validated based on a determination that all of the human users approve of the suggested training phrase.

14. The system of claim 1, wherein the intent recognition application is further configured to generate the suggested training phrases by using one or more portions of the transcripts as seed phrases.

15. The system of claim 14, wherein the intent recognition application is further configured to use one or more manually entered seed phrases to generate the suggested training phrases.

* * * * *